US010527138B2

(12) United States Patent
Bausch et al.

(10) Patent No.: US 10,527,138 B2
(45) Date of Patent: Jan. 7, 2020

(54) GEAR DEVICE FOR FITTING TO A DRIVE SHAFT

(71) Applicant: Lock Antriebstechnik GmbH, Ertingen (DE)

(72) Inventors: Manfred Bausch, Unlingen (DE); Marius Baur, Oberwachingen (DE); Daniela Vogel, Bingen (DE)

(73) Assignee: Lock Antriebstechnik GmbH, Ertingen (DE)

( * ) Notice: Subject to any disclaimer, the term of this patent is extended or adjusted under 35 U.S.C. 154(b) by 179 days.

(21) Appl. No.: 15/374,028

(22) Filed: Dec. 9, 2016

(65) Prior Publication Data

US 2018/0112749 A1 Apr. 26, 2018

(30) Foreign Application Priority Data

Oct. 24, 2016 (DE) .................... 20 2016 105 970 U

(51) Int. Cl.
| | |
|---|---|
| *F16H 19/04* | (2006.01) |
| *F16H 35/10* | (2006.01) |
| *F16H 1/12* | (2006.01) |
| *F16H 55/17* | (2006.01) |
| *F16H 55/26* | (2006.01) |
| *F16H 57/021* | (2012.01) |

(52) U.S. Cl.
CPC .............. *F16H 19/04* (2013.01); *F16H 1/12* (2013.01); *F16H 35/10* (2013.01); *F16H 55/17* (2013.01); *F16H 55/26* (2013.01); *F16H 57/021* (2013.01); *F16H 2019/046* (2013.01)

(58) Field of Classification Search
CPC ...... F16H 1/12; F16H 19/04; F16H 2019/046; F16H 35/10; F16H 55/26; F16H 57/021; F16H 57/023; F16H 57/12
USPC .................... 74/422, 89.17, 29, 30
See application file for complete search history.

(56) References Cited

U.S. PATENT DOCUMENTS

| | | | | |
|---|---|---|---|---|
| 1,757,720 A | * | 5/1930 | King ........................ | E05F 11/14 74/422 |
| 6,227,065 B1 | * | 5/2001 | Petersen ................. | F16H 19/04 384/295 |
| 6,585,074 B2 | * | 7/2003 | Katou ...................... | B62D 3/12 180/428 |

(Continued)

FOREIGN PATENT DOCUMENTS

| | | | | |
|---|---|---|---|---|
| DE | 102011012203 A1 | * | 8/2012 | ............. F16H 19/04 |
| EP | 0764754 A1 | * | 3/1997 | .............. E05F 11/14 |

(Continued)

*Primary Examiner* — Victor L MacArthur
*Assistant Examiner* — Joseph Brown
(74) *Attorney, Agent, or Firm* — Burr & Brown, PLLC

(57) ABSTRACT

Gear device for fitting to a drive shaft, having a base member which at least partially surrounds the drive shaft, a pinion which is arranged in the assembled state on the drive shaft, and a toothed rod which in the assembled state is assembled on the base member cooperates with the pinion and extends through the base member, wherein the base member is open at one side in such a manner that it can be fitted to a drive shaft in a radial direction. The gear device is characterized in that the base member comprises a retention member, wherein the retention member is configured to secure the pinion in the assembled state arranged on the base member in a position relative to the base member without additional components.

13 Claims, 4 Drawing Sheets

(56) References Cited

U.S. PATENT DOCUMENTS

| | | | | |
|---|---|---|---|---|
| 6,837,642 B1* | 1/2005 | Lin | ................... | F16B 7/105 403/109.1 |
| 2005/0238544 A1* | 10/2005 | Briscoe | ................ | F16H 19/04 422/562 |
| 2009/0056487 A1* | 3/2009 | Chiu | ................... | F16B 2/08 74/422 |
| 2016/0128473 A1* | 5/2016 | Ng | ................... | F16H 19/04 74/422 |

FOREIGN PATENT DOCUMENTS

| | | | | |
|---|---|---|---|---|
| EP | 0851150 A1 * | 7/1998 | ............. | F16H 19/04 |
| NL | 1004700 C1 * | 2/1998 | ............. | F16H 19/04 |

* cited by examiner

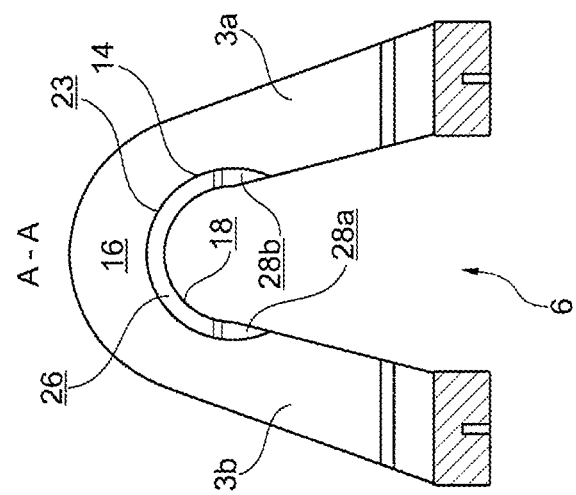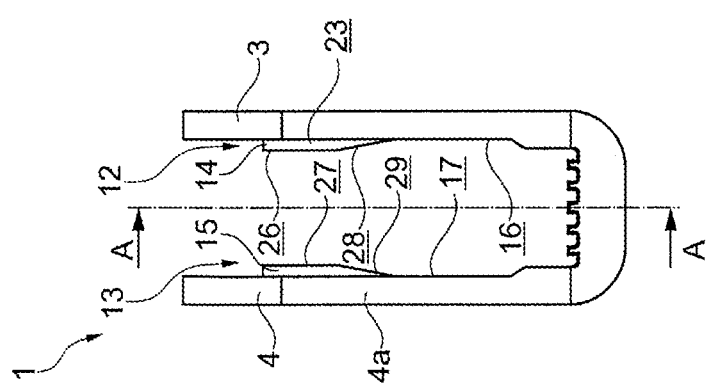

GEAR DEVICE FOR FITTING TO A DRIVE SHAFT

This application claims the benefit under 35 USC § 119(a)-(d) of German Application No. 20 2016 105 970.4 filed Oct. 24, 2016, the entirety of which is incorporated herein by reference.

FIELD OF THE INVENTION

The present invention relates to a gear device for fitting to a drive shaft.

BACKGROUND OF THE INVENTION

Gear devices for fitting to a drive shaft are already known in various embodiments.

For example, toothed rod gear devices are used in greenhouses in order to move glass leaves which are connected to one end of the toothed rod into different pivot positions, in particular, into a closed position and into a completely open position.

Often, a whole series of toothed rod gear devices are arranged on a drive shaft in order to consequently be able to operate a large number of glass leaves which are each connected to an end of a respective toothed rod of the toothed rod gear.

SUMMARY OF THE INVENTION

An object of the present invention is to configure a gear device, in particular, a toothed rod gear device, of the type referred to in the introduction in such a manner that the assembly of the gear device is improved or simplified.

The present invention is based on a gear device for fitting to a drive shaft, having a base member which at least partially surrounds the drive shaft, a pinion which is arranged in the assembled state on the drive shaft, and a toothed rod which in the state assembled on the base member cooperates with the pinion and extends through the base member, wherein the base member is open at one side in such a manner that it can be fitted to a drive shaft in a radial direction.

In an advantageous embodiment of the present invention, the base member comprises two legs which are advantageously open at one side in such a manner that the legs can be fitted in a radial direction to the drive shaft. In particular, the legs are connected to each other at mutually opposed sides by means of webs so that there is produced in each case a flap which is orientated transversely relative to a drive shaft and in which the toothed rod can be placed.

Preferably, the pinion is constructed in several parts, in particular, in two parts. For example, the pinion comprises two pinion halves. The pinion can thereby be arranged on a drive shaft which is already assembled in a comparatively simple manner.

The core of the present invention is that the base member comprises a retention member, wherein the retention member is configured to secure the pinion in the state arranged on the base member in a position relative to the base member without additional components.

Assembly of the gear device is thereby simplified. In particular, the pinion can thereby be arranged on the base member in such a manner that the base member can be positioned, in particular, rotated, relative to the pinion or, in the state arranged on the drive shaft, relative to the drive shaft.

If the pinion is constructed in two parts, the base member advantageously holds both pinion halves in the arranged state together in an axial direction of the pinion. This prevents the pinion from being able to fall apart in an axial direction, whereby the pinion is retained in a radial direction on the base member and/or on the drive shaft.

The retention member is advantageously provided on the base member so as to overhang, project and/or protrude. It is also conceivable for the retention member to be provided on the base member so as to be indented, inset, recessed and/or stepped. Preferably, the retention member is constructed in an annular and/or annular-disc-like manner. Advantageously, the retention member is provided on a leg of the base member. The retention member is, for example, provided integrally with the base member.

At least one leg of the base member is advantageously provided in such a flexible manner that the leg can be moved, for example, bent, toward or away from the adjacent second leg of the base member. Preferably, both legs of the base member are provided in a flexible or resilient manner. The leg or the legs is/are advantageously constructed in such a manner that the web behaves in a flexible manner exclusively in one direction and is provided in the direction of the two remaining spatial directions in a comparatively rigid and/or stable manner. Preferably, both legs are provided so as to be resiliently movable parallel with a rotation axis of the pinion in the state arranged on the base member.

Furthermore, it is advantageous for the retention member to be constructed in such a manner that the pinion can be snap-fitted to the retention member. The assembly of the pinion on the base member is thereby comparatively simplified and the pinion is secured to the base member in one position.

Advantageously, the pinion can be clip-fitted to the retention member, for example, is able to be placed, fitted, inserted and/or integrated. It is also conceivable for the retention member conversely to be able to be engaged with the pinion, for example, able to be clip-fitted, placed, fitted, inserted and/or integrated.

It is further proposed that the retention member be constructed in a hollow-cylindrical manner, wherein the retention member has an opening along a cylinder axis, wherein the retention member is open at one side in such a manner that the drive shaft can be inserted in a radial direction, in particular clip-fitted.

Assembly of the base member on the drive shaft, in particular on a drive shaft which is provided so as to be already assembled, is simplified.

Advantageously, the retention member comprises a cylinder cover which has the opening. The cylinder cover is, for example, constructed in a slotted manner. The retention member is advantageously provided so as to be at least approximately cylinder-symmetrical. For example, a cylinder symmetry of the retention member is Interrupted exclusively by the opening.

It is also advantageous for an inner radius of the retention member to be greater than or equal to a radius of the drive shaft.

The retention member can thereby surround or engage around the drive shaft in the state in which the base member is arranged on the drive shaft. For example, the base member can be fitted with the retention member on the drive shaft, in particular clip-fitted and/or clamped on. The drive shaft is provided in the state arranged on the base member so as to be able to be moved about a rotation axis of the drive shaft relative to the base member.

Preferably, a plain bearing for the drive shaft is constructed on the base member. The retention member may advantageously at least partially surround the plain bearing. For example, in the state in which the base member is arranged on the drive shaft, the inner radius of the retention member is provided opposite the outer radius, for example, the bearing radius of the drive shaft. It is also conceivable for a component of the pinion to be provided between the inner radius of the retention member and the outer radius of the drive shaft in the arranged state.

It is also found to be advantageous for the retention member to have bearing means for supporting the drive shaft.

For example, an inner cylindrical covering face of the retention member forms a bearing means in the form of a plain bearing surface for the drive shaft and/or the pinion. It is also conceivable for an outer cylindrical covering face of the retention member to form a bearing means in the form of a plain bearing surface for the pinion. The pinion is advantageously rotatably provided at the fixed position on the base member. In particular, the pinion can be arranged on the base member in such a manner that it is rotatably provided about the rotation axis thereof.

In an advantageous variant of the present invention, the pinion has receiving means, wherein the receiving means are constructed in an annular manner, wherein the receiving means are configured to receive a retention member, in particular, two retention members, of the base member.

For example, the retention member can be engaged in the receiving means of the pinion. Preferably, the receiving means are provided on the pinion in an annular and/or hollow-cylindrical manner. Advantageously, the receiving means are provided in a state recessed in the pinion. For example, the receiving means are constructed in a state recessed in the pinion in an axial and/or a radial direction of the pinion.

It is also conceivable for the receiving means to be provided on the pinion so as to protrude, for example, protruding in an axial direction of the pinion. It is conceivable for the receiving means to be provided on the pinion so as to protrude and, in the state in which the pinion is arranged on the base member, to engage in a retention member, for example, to be latched in a retention member.

Furthermore, it is advantageous for a radius, in particular, an inner radius of the receiving means, to be provided so as to be greater than or equal to an outer radius of the retention member. The receiving means may surround the retention member or at least portions of the retention member in the state arranged on the base member. For example, the pinion is clip-fitted to the retention member with the receiving means.

It is further proposed that the base member has two mutually opposed retention members which are, in particular, arranged in a mirror-symmetrical manner. In particular, two retention members are provided on the base member so as to be opposite each other. For example, a retention member is constructed on a leg of the base member in each case. The pinion can, for example, be positioned so as to be able to be engaged between the two retention members. Preferably, the pinion can be positioned between the two legs of the base member, in particular, is secured by means of at least one retention member to the base member between the two legs of the base member.

In an advantageous embodiment of the gear device, the retention member comprises bearing means for supporting the pinion, in particular, for supporting the receiving means of the pinion. The bearing means of the retention member are, for example, provided as a plain bearing surface.

It is also advantageous for the pinion to comprise receiving means which are provided in a mirror-symmetrical manner on the pinion. For example, the receiving means, when viewed in an axial direction of the pinion, are provided opposite each other, for example, in a protruding or, for example, recessed manner on the pinion.

It is also conceivable for the pinion to have receiving means, for example, in the form of a pinion ring, which are provided in such a resilient manner that the pinion can be engaged with the receiving means on a retention member of the base member.

Furthermore, it has been found to be advantageous for the base member to comprise a bearing portion, for, in particular, movably supporting the drive shaft.

In an advantageous embodiment of the present invention, the open side of the base member has, below a region in which a rotation axis of the drive shaft is in the arranged state, a clear width which is smaller than a diameter of a cylindrical plain bearing surface of the base member on which the pinion and/or the drive shaft is supported in the state arranged on the base member.

BRIEF DESCRIPTION OF THE DRAWINGS

An exemplary embodiment is explained in greater detail with reference to the schematic drawings below, with further details and advantages being set out.

FIG. 1 is a side view from the front of a base member of a gear device according to the present invention;

FIG. 2 is a sectioned view of the base member from FIG. 1;

DETAILED DESCRIPTION OF THE INVENTION

Figure 3:
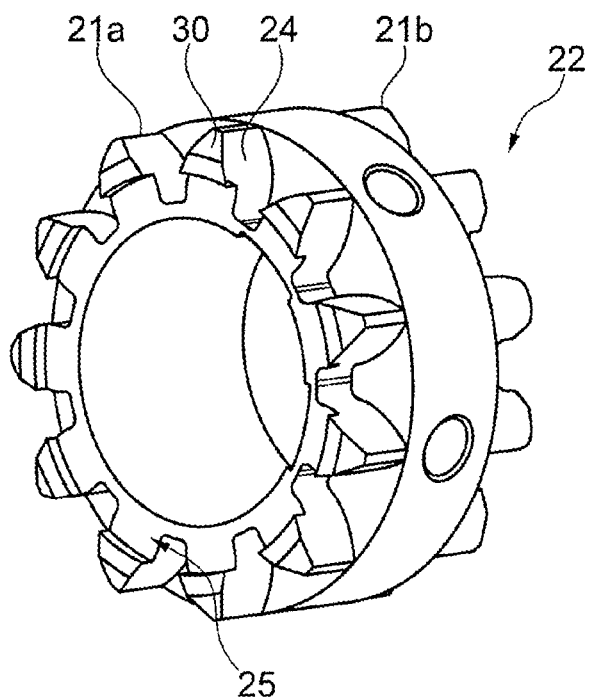
FIGS. 3 and 4 are perspective views of a pinion in one-piece and in two-piece form.

In FIG. 1, a base member 1 of a gear device 2 (see also FIGS. 5, 6) is illustrated. The base member 1 comprises two legs 3, 4 which have opposing leg portions 3a and 3b or leg portions 4a and 4b, respectively.

Two leg portions 3a, 4a or leg portions 3b, 4b are in each case connected to each other by means of a connection web 5a, 5b. In this manner, the leg portions 3a, 4a form with the connection web 5a and the leg portions 3b, 4b form with the connection web 5b a U-shaped loop of the base member 1. The connection webs 5a, 5b comprise, in particular, plain bearing surfaces 10a, 10b for supporting a toothed rod 11 of the gear device 2. The plain bearing surfaces 10a, 10b for supporting the toothed rod 11 are advantageously provided integrally with the base member 1 of the gear device 2.

Figure 5:
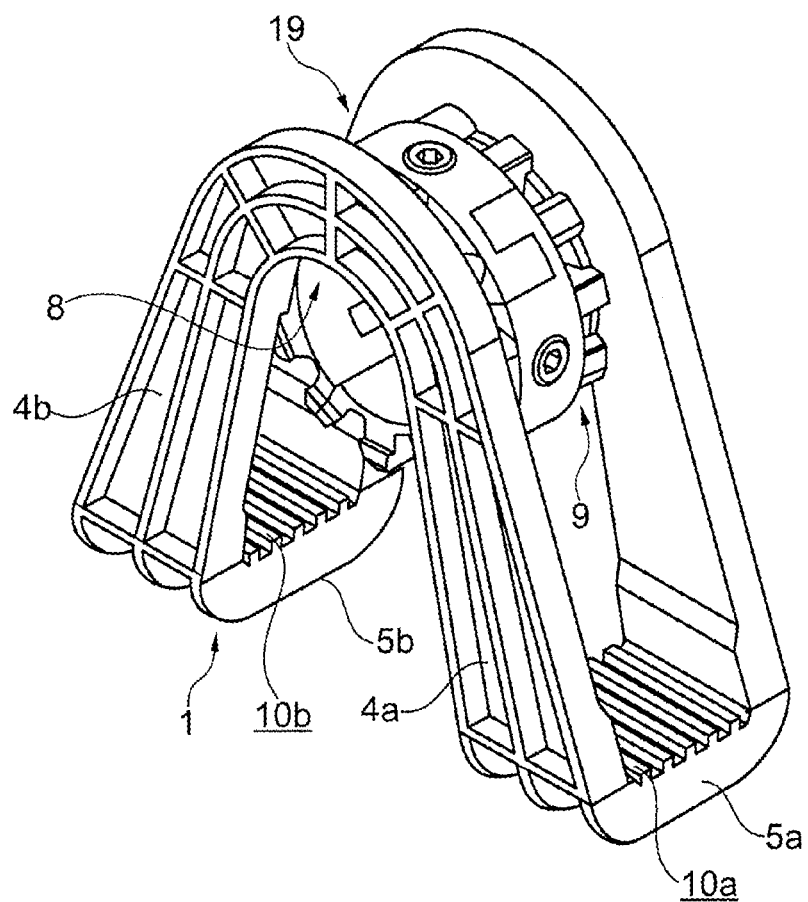
FIG. 5 is a perspective view from the top front side of the base member according to FIG. 1, with the pinion arranged.

The legs 3, 4 are provided in a curved manner and comprise an opening 6 in which a drive shaft 7 can be introduced by the base member 1 being radially fitted, for example, over the drive shaft 7 until the drive shaft 7 is, in particular, in full abutment with bearing recesses 8, 9 of the base member 1 and a plain bearing surface which is constructed, for example, at that location (FIG. 5).

At an inner side 12, 13 of the legs 3, 4 in the region of the bearing recesses 8, 9, for example, annular retention members 14, 15 are provided on the base member 1 on inner faces 16, 17 of the legs 3, 4, for example, in a protruding manner.

Advantageously, an inner annular face of the retention member 14 is constructed as a plain bearing surface 18, on which the drive shaft 7 in the arranged state is, in particular, in full abutment (FIG. 2). The same arrangement may also be provided on the retention member 15 (not shown). Preferably, there is provided on an outer annular face another plain bearing surface 23 by means of which a pinion 19, 22 which is assembled on the base member 1 is, for example, movably supported on the base member 1. The opening 6 of the legs 3, 4 preferably at the same time also forms an opening of the retention members 13, 14.

Figure 4:
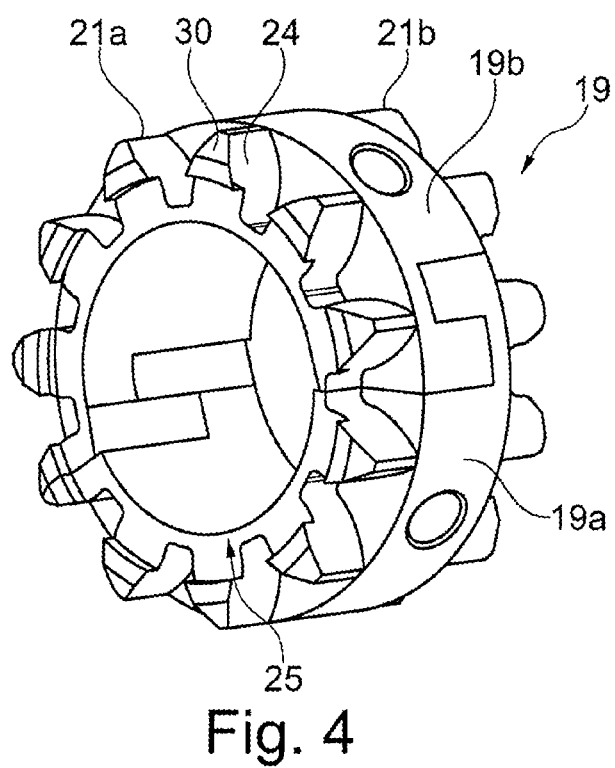

FIGS. 3 and 4 show a one-piece pinion 22 and a multi-piece pinion 19. The multi-piece pinion 19 comprises, for example, two pinion halves 19a, 19b. The pinion halves 19a, 19b are, for example, fitted to each other or, for example, screwed to each other. In an advantageous variant of a pinion 19, the pinion halves 19a, 19b comprise at the ends thereof a toothed structure by means of which they can be fitted to each other and consequently, for example, can be clamped to each other. The pinions 19, 22 are, for example, secured against torsion by means of fixing screws 20a, 20b on the drive shaft 1 (FIG. 6).

The pinion 19, 22 comprises radially at the outer side a pinion ring which, for example, when viewed in a radial direction, is provided in a state divided in two and comprises two receiving members in the form of pinion ring halves 21a, 21b. Consequently, the first pinion ring half 21a can be formed on a first axial outer face of the pinion 19, 22 and a second pinion ring half 21b can be provided on a second axial outer face of the pinion 19, 22 opposite the first axial outer face. The two pinion ring halves 21a, 21b are provided, for example, in a mirror-symmetrical manner on the pinion 19, 22. It is also conceivable for the pinion ring half 21a, 21b to be provided so as to protrude from a radial outer face of the pinion 19, 22.

Another receiving member in the form of a pinion tooth 24 of the pinion ring, in particular, of the pinion ring halves 21a, 21b, is advantageously provided in a hook-like manner, for example, L-shaped manner. Advantageously, the pinion tooth 24 protrudes in an axial direction from the pinion 19, 22. A plurality of pinion teeth 24 are, for example, arranged so as to be distributed in a uniform manner on a radius of the pinion 19, 22. The hook-like pinion teeth 24 which protrude in an axial direction thereby form an, in particular, annular or disc-like receiving region 25 for receiving the retention member 14, 15 in the state arranged on the gear device 2. A pinion tooth 24 thereby engages around or surrounds the retention member 14, 15 in the state assembled on the gear device 2. The retention member 14, 15 is, for example, in the assembled state of the gear device 2 provided in the receiving region 25 of the pinion 19, 22. Advantageously, the pinion ring, in particular, the pinion tooth 24, is provided in a rigid and non-resilient manner.

Figure 6:
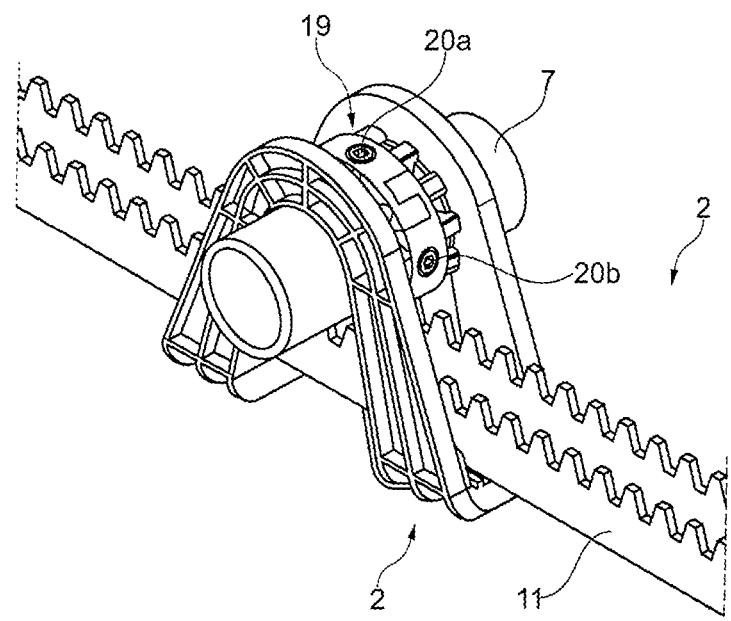
FIG. 6 is a perspective view from the top front side of the gear device having a base member according to FIG. 1 and a pinion according to FIG. 3 with the toothed rod and drive shaft arranged.

FIG. 6 shows the completely assembled state of the tooth rod gear 2 with the toothed rod 11 which meshes with the pinion 19. As a result of the inserted, assembled toothed rod 11, the base member 1 can, in particular, no longer be lifted from the drive shaft 7 in a radial direction.

A pinion 19, 22 can be clamped to the base member 1 in a radial direction. To this end, the pinion 19, 22 is advantageously first assembled on the drive shaft 7 and the base member 1 is subsequently fitted or pushed with the opening 6 in a radial direction on the pinion 19, 22 and the drive shaft 7. To this end, the legs 3, 4 of the base member 1 are advantageously bent away from each other to a comparatively small degree so that the pinion ring halves 21a, 21b and consequently the pinion tooth 24 can be fitted past an inner face 26, 27 of the retention members 13, 14 over the retention members 13, 14.

For simplified assembly of the base member 1 and the pinion 19, 22, the retention members 13, 14 comprise to this end, for example, a chamfered face 28a, 28b, 29a, 29b which starting from the inner face 26, 27 of the retention member 13, 14 extends in the direction of the inner faces 16, 17 of the leas 3, 4 (FIG. 1).

Furthermore, a pinion tooth 24, for example, radially at the outer side, comprises a chamfered portion 30 which extends in a radial direction from a pinion outer side in the direction of the rotation axis of the pinion 19, 22 in an axial direction away from the pinion. When the pinion 19, 22 is fitted to the base member 1, a bending of the legs 3, 4 is thereby supported and the assembly is simplified. Advantageously, the legs 3, 4 are bent apart in a comparatively easy manner simply by the fitting of the base member 1 to the pinion 19, 22.

It is also conceivable for the pinion 19, 22 to be clip-fitted or clamped to the base member 1 in such a manner by the pinion 19, 22 first being assembled on the drive shaft 7 and subsequently the base member 1 with the opening 6 being fitted in a radial direction to the pinion 19, 22 and being fitted to the drive shaft 7, wherein during the fitting operation the retention members 14, 15, in particular, resiliently give way in the region of the chamfered faces 28a, 28b or 29a, 29b perpendicularly to the fitting direction and perpendicularly to the rotation axis of the drive shaft so that the pinion 19, 22 is retained on the base member 1.

LIST OF REFERENCE NUMERALS

1 Base member
2 Gear device
3-4 Legs
3a, 3b Leg portion
4a, 4b Leg portion
5a, 5b Connection web
6 Opening
7 Drive shaft
8, 9 Bearing recess
10a, 10b Plain bearing surface
11 Toothed rod
12, 13 Inner side
14, 15 Retention member
16, 17 inner face
18 Plain bearing surface
19, 22 Pinion
19a, 19b Pinion half
20a, 20b Fixing screw
21a, 21b Pinion ring half
23 Plain bearing surface
27 Pinion tooth
28 Receiving region
26, 27 Inner face
28a, 28b Face
29a, 29b Face
30 Chamfered portion

The invention claimed is:

1. A gear device for fitting to a drive shaft, having a base member which at least partially surrounds the drive shaft, a pinion, and a toothed rod which in an assembled state cooperates with the pinion and extends through the base member, wherein the base member comprises first and second legs, the first and second legs each having a proximal end and a distal end, and being open at one side in such a manner that the legs can be fitted in a radial direction to the drive shaft, wherein the legs are connected to each other at mutually opposed sides by means of webs, thereby producing in each case a flap which is oriented transversely relative to the drive shaft, and in which the toothed rod can be placed, wherein the base member comprises a first retention member defined on an inner surface of the first leg intermediate the proximal end and the distal end thereof and having a first inner face, and a second retention member defined on an inner surface of the second leg intermediate the proximal end and the distal end thereof and having a second inner face opposing and facing the first inner face of the first retention member, wherein the opposing first and second inner faces of the first and second retention members are configured both to secure only the pinion on the base member between the first and second legs of the base member without the drive shaft, and to secure the pinion on the base member between the first and second legs of the base member, with the pinion assembled on the drive shaft, and wherein the first and second legs have a distance therebetween sufficient for the pinion to slide past the first and second inner faces of the retention members.

2. The gear device according to claim 1, wherein the retention members are configured such that the pinion can be snap-fitted thereto.

3. The gear device according to claim 1, wherein the retention members are configured in a hollow-substantially cylindrical manner, and wherein the retention members have an opening along an axis defined therein, so that the retention members are open at one side in such a manner that the drive shaft can be inserted in a radial direction.

4. The gear device according to claim 1, wherein an inner radius of each of the retention members is greater than or equal to a radius of the drive shaft.

5. The gear device according to claim 1, wherein each of the retention members further includes a bearing surface supporting the drive shaft.

6. The gear device according to claim 1, wherein the pinion has annular receiving members configured to receive the retention members of the base member.

7. The gear device according to claim 6, wherein an inner radius of the receiving members is greater than or equal to an outer radius of the retention members.

8. The gear device according to claim 6, wherein each of the retention members comprises a bearing supporting the pinion.

9. The gear device according to claim 8, wherein the bearing supports the receiving members.

10. The gear device according to claim 1, wherein the pinion comprises receiving members that are provided in a mirror-symmetrical manner on the pinion.

11. The gear device according to claim 1, wherein the base member further comprises a bearing portion supporting the drive shaft.

12. The gear device according to claim 1, wherein the open side of the base member has, proximate a region in which a rotation axis of the drive shaft is in the assembled state defined, a width which is different from a diameter of a cylindrical plain bearing surface of the base member.

13. The gear device according to claim 1, wherein the retention members are arranged in a mirror-symmetrical manner.

* * * * *